Aug. 16, 1938.   A. H. NIEMANN   2,127,069
TRAILER SUSPENSION
Filed Sept. 16, 1936   2 Sheets—Sheet 1

INVENTOR.
AUGUST H. NIEMANN
BY Christian R. Nielsen
ATTORNEY.

Aug. 16, 1938.　　　A. H. NIEMANN　　　2,127,069
TRAILER SUSPENSION
Filed Sept. 16, 1936　　　2 Sheets-Sheet 2

INVENTOR.
AUGUST H. NIEMANN
BY Christian R. Nielsen
ATTORNEY.

Patented Aug. 16, 1938

2,127,069

UNITED STATES PATENT OFFICE 2,127,069

TRAILER SUSPENSION

August H. Niemann, Milwaukee, Wis.

Application September 16, 1936, Serial No. 101,118

2 Claims. (Cl. 280—33.5)

My invention relates to trailer suspension, and more particularly to a type of suspension that acts as a support for the front end of an automobile trailer.

The object of my invention is to provide a method of suspending the front end of a 3-wheel trailer on a spring supported wheel so as to provide maximum comfort as well as a rotatable mounting to permit easy turning and manipulation of the trailer.

Another object of my invention is to provide such a device that permits ready access to the wheel when it becomes necessary to change a tire or the like.

Still another object of my invention is to provide a trailer suspension that will take up the load of the trailer leaving the automobile to furnish only the motive power.

It is manifest to any one familiar with the art that the manipulation of a trailer in traffic or on a narrow road is indeed a problem. With the device illustrated and described it is possible to maneuver the trailer into any position while parking, leaving the unit as compact as possible and eliminating any projecting draw bar or the like.

The invention is fully described in the following specification of which the accompanying drawings are a part and in which the separate parts of my improvement are designated by suitable reference characters in each of the views and in which Fig. 1 is a plan view of the assembled device.

Figure 1:
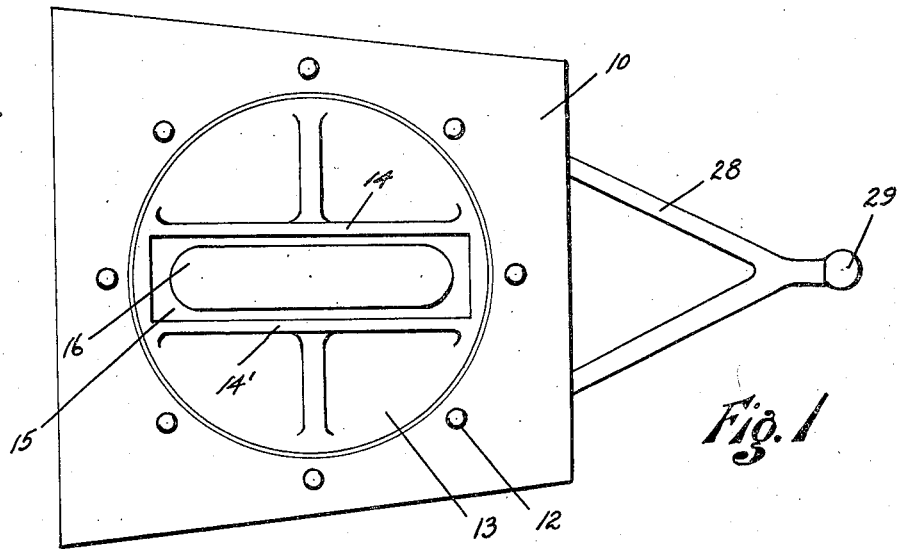
Figure 2:
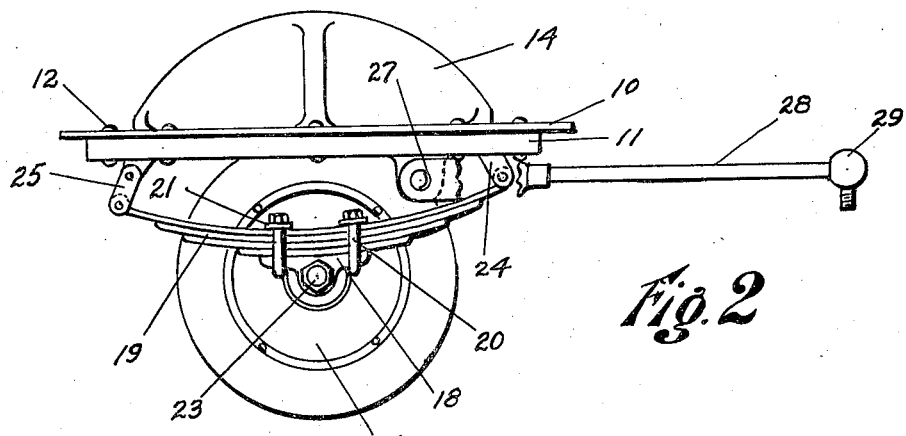
Fig. 2 is a side view of the device as illustrated in Fig. 1.
Figure 3:
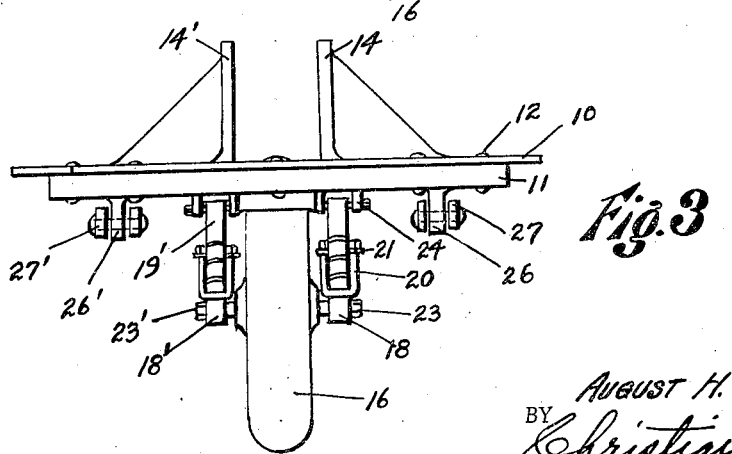
Fig. 3 is a front view of the device illustrating the manner of mounting the wheel between two semi-elliptic springs mounted on a rotatable support.
Figure 4:
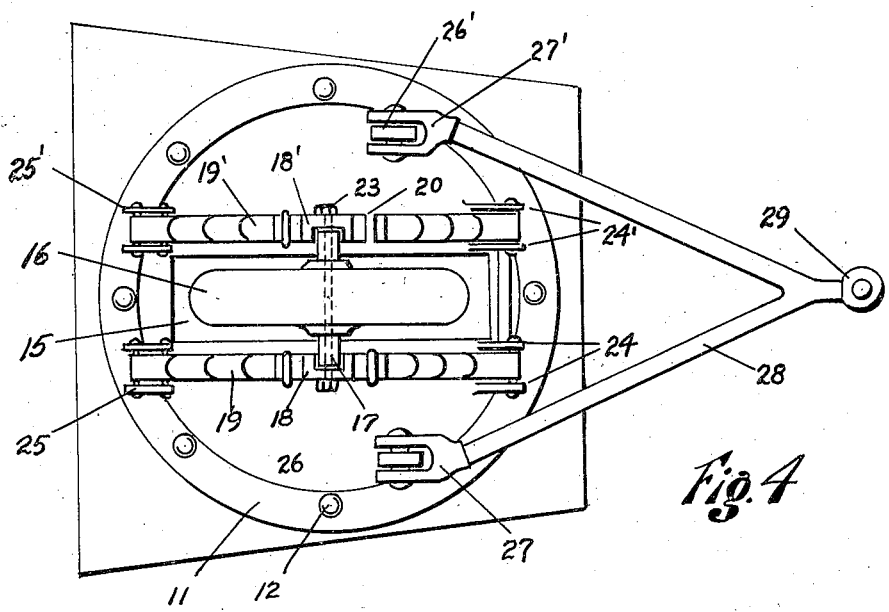
Fig. 4 is a bottom view of the assembled device.
Figures 5, 6:
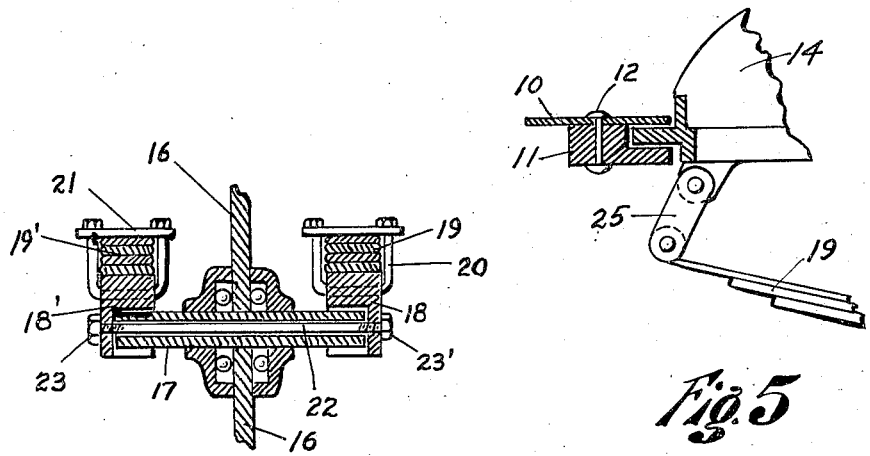
Fig. 5 is a cross sectional view of a section showing the rotatable support and the spring mounting.
Fig. 6 is a fragmentary cross sectional view of the wheel mounting illustrating the method used to permit access to the wheel for removing the tire.

Referring to the drawings in detail wherein like characters of reference denote corresponding parts, the reference 10 illustrates a platform disposed for the support and attachment of the front end of a trailer. There is an annular bearing 11 fastened to the lower side of the platform 10 by means of rivets or bolts 12. A turn table in the form of a rotatable member 13 engages the bearing 11 and may be arranged to turn freely by means of roller bearings, ball bearings, or in any other suitable manner. There are wheel guards 14 and 14' projecting upward and at right angle to the rotatable member 13 on both sides of the rectangular opening 15 in the member 13.

The wheel 16 is mounted in any conventional manner on ball or roller bearings to a tubular shaft 17. This shaft 17 is journaled at both ends in the bearing blocks 18 and 18'. These bearings 18 and 18' are attached to semi-elliptic springs 19 and 19' consisting of a plurality of spring leaves and are clamped to the springs 19 and 19' by means of rectangular yokes 20 supported by plate members 21. The bearings 18 18' are constructed open at their inside lower edge. The wheel 16 is attached to the bearings 18 and 18' by means of a rod 22 inserted through the tubular shaft 17 and the bearings 18 and 18'. Nuts 23 and 23' hold the rod in position thereby securely mounting the shaft 17 into the bearings 18 and 18'. The springs 19 and 19' are attached to the member 13 by means of shackles 24 and 24' in the front and linked shackles 25 and 25' in the rear. This method permits the free action of the resilient springs 19 and 19', thereby providing the comfortable action desired.

When it becomes necessary to remove the wheel to change a tire or the like, it is only necessary to jack up the front end of the trailer, loosen the nuts 23, remove the rod 22 and the tubular shaft 17 can be readily removed out of the bottom of the bearings 18 and 18'.

On the lower side of the rotatable member are downwardly projecting members 26 and 26'. These members 26 and 26' pivotally support yoke members 27 and 27' which constitute the depending ends of the trailer draw bar 28 which is fastened to the automobile by means of an attaching member at 29 in any suitable manner.

While I have herein disclosed with considerable particularity a single embodiment of my invention, it will be manifest to persons skilled in the art, that many changes in the general arrangement, form, and configuration of the structure may be made, and parts thereof may be varied within the scope of the appended claims.

Having thus described my invention, what I claim and desire to secure by Letters Patent in the United States is:

1. A device of the character described comprising in combination a horizontal plate, an annular bearing mounted at its circumferential area to and adjacent the bottom side of said plate, a support member provided with a rectangular opening, guide plates extending upward at right angle to said support member on both sides of said opening, said support member rotatably mounted to said plate by means of said annular bearing, semi-elliptic springs mounted to the bottom of said support on both sides of the rectangular opening, bearings fastened to said semi-elliptic springs in opposite relation to one another, said bearings being provided with an opening in their lower sides, a tubular horizontal shaft, a wheel vertically mounted on said horizontal shaft, the ends of said shaft being journaled in said bearings on said resilient members, a rod through said shaft and bearing walls for retaining same in an assembled position, and means disposed outside of said bearings for attaching the device to an automobile or the like.

2. A device of the character described comprising in combination a horizontal plate, an annular bearing mounted adjacent the bottom side of said plate, a support member rotatably mounted to said plate by means of said annular bearing, said support member provided with a rectangular opening at its center, semi-elliptic springs mounted to the bottom of said support member, on both sides of said opening bearings fastened to said resilient members in opposite relation to one another, said bearings being provided with an opening in a part of their lower sides, a horizontal shaft of tubular construction, a wheel rotatably mounted in a vertical position on said horizontal shaft, said shaft rigidly journaled on both ends in said bearings, a rod through said tubular shaft and bearings for retaining the wheel in proper alignment, and means for attaching the entire device to an automobile or the like.

AUGUST H. NIEMANN.